(12) United States Patent
Krishnan et al.

(10) Patent No.: US 10,938,636 B2
(45) Date of Patent: Mar. 2, 2021

(54) APPARATUS AND METHOD FOR PHYSICAL LAYER TRANSCEIVER CONFIGURATION

(71) Applicant: Dell Products L.P., Round Rock, TX (US)

(72) Inventors: Sarat Krishnan, Austin, TX (US); Chadwick Thomas Berry, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 28 days.

(21) Appl. No.: 16/179,527

(22) Filed: Nov. 2, 2018

(65) Prior Publication Data
US 2020/0145285 A1    May 7, 2020

(51) Int. Cl.
*H04L 12/24* (2006.01)
*H04L 29/08* (2006.01)
*H04L 29/06* (2006.01)

(52) U.S. Cl.
CPC .......... *H04L 41/0803* (2013.01); *H04L 69/18* (2013.01); *H04L 69/24* (2013.01); *H04L 69/323* (2013.01)

(58) Field of Classification Search
CPC ... H04L 41/0803; H04L 69/323; H04L 69/18; H04L 69/24
See application file for complete search history.

(56) References Cited

U.S. PATENT DOCUMENTS

| 7,808,249 B1* | 10/2010 | Lo | H04L 43/50 |
| | | | 324/534 |
| 8,520,553 B2* | 8/2013 | Yousefi | H04L 12/12 |
| | | | 370/255 |
| 9,130,746 B1* | 9/2015 | Lo | H04L 5/14 |
| 9,531,594 B2* | 12/2016 | Venkatesan | H04L 41/0809 |
| 2009/0096592 A1* | 4/2009 | Wu | H04B 3/542 |
| | | | 307/66 |
| 2017/0315887 A1* | 11/2017 | Olson | G06F 11/2033 |
| 2018/0219732 A1* | 8/2018 | Liu | H04L 41/0886 |
| 2019/0327146 A1* | 10/2019 | Mahadevan | H04L 41/0853 |

\* cited by examiner

*Primary Examiner* — Omar J Ghowrwal
(74) *Attorney, Agent, or Firm* — Haynes and Boone, LLP

(57) ABSTRACT

A physical layer transceiver (PHY) ability configuration system includes a peer computing device having a first communication subsystem that includes a first PHY device coupled to a first port. They system also includes a networking device having a second communication subsystem that includes a second PHY device and that is configured to operate in a plurality of modes and a second port that is coupled to the second PHY device. The networking device determines, in response to a cable coupling the first port and the second port while the second PHY device is configured to operate in a first mode of the plurality of modes, that a link is not detected at the second port. The networking device changes the first mode to a second mode of the plurality of modes, and detects the establishment of the link between the first port and the second port.

10 Claims, 4 Drawing Sheets

APPARATUS AND METHOD FOR PHYSICAL LAYER TRANSCEIVER CONFIGURATION

BACKGROUND

The present disclosure relates generally to information handling systems, and more particularly to physical layer transceiver ability configuration in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, networking devices and other computing devices, are often configured to transmit and receive Ethernet protocol communications via transceivers such as Small Form-factor Pluggable (SFP) transceivers, enhanced Small Form-factor Pluggable (SFP+) transceivers, SPF28 transceivers, 10 Gigabit Small Form-factor Pluggable (XFP) transceivers, Quad(4-channel) Small Form-factor Pluggable (QSFP or QSFP+) transceivers, and/or a variety of other transceivers known in the art. Depending on the type of transceiver used, a port on a computing device may be configured to transmit data in a variety of operation modes according to several variable transmission parameters including, for example, transmission speed, duplex mode, flow control, and/or a variety of other transmission parameters known in the art. Each computing device may have different variable transmission parameters defined by the computing device manufacturer of that computing device and/or based on when the computing device was manufactured, and thus any particular computing device may have a different set of operation modes than the computing device(s) to which it is connected via the transceiver.

Auto-negotiation may be employed in order to address the possibility of computing devices transmitting data between each other via different operation modes. Auto-negotiation is used by connected computing devices to determine the best operation mode that is shared by each of the connected computing devices. More specifically, auto-negotiation is a physical layer ability used in Ethernet networks to allow two computing devices that need to communicate with each other to negotiate the appropriate variable transmission parameters and settle on the highest, mutually supported set of data transmission operation characteristics. The concept of auto-negotiation was introduced as part of the Fast Ethernet standard, and has progressed as each new Ethernet technology has come to market, incorporating new technology abilities as required.

To keep pace with the rapid evolution of technology in a data center, the networking industry continues to deliver computing devices with higher and higher bandwidth capabilities. For example, the finalization of the Institute of Electrical and Electronics Engineers (IEEE) 802.3bj standard, as well as the introduction of 100 Gbps over a 4×25 G physical layer (PHY), has opened a path to 25 GbE over a single lane. The 25 Gigabit Ethernet Consortium was formed with the intent to quickly drive a standard for 25 Gigabit Ethernet (GbE) over a single lane based on the IEEE 802.3bj standard. Shortly after the 25 Gigabit Ethernet Consortium formed, the IEEE 802.3 Task Force for single lane 25 Gbps Ethernet was also formed, and these two bodies continued developing their version of a standard in parallel. As each of these standards leverage the IEEE 802.3bj standard, they are similar, but they also include some slight differences. For example, depending on when a given 25 GbE computing device was introduced to the market, the computing device may be pre-standard (i.e., both the Consortium and IEEE) compliant with the 25 Gigabit Ethernet Consortium standard, compliant with the IEEE 802.3by (25 Gigabit Ethernet) standard, or a combination of compliant with both the 25 Gigabit Ethernet Consortium standard and the IEEE 802.3by (25 Gigabit Ethernet) standard.

With the advent of these standards, auto negotiation, as well as other physical layer abilities such as forward error correction (FEC), has become very important for a link to be enabled between computing devices. Because each computing device that is being connected together may have been manufactured at a different point in time with respect to the 25 GbE "standards," each may have slightly different capabilities and/or default settings. Furthermore, auto-negotiation and FEC settings may vary based on the cable and/or the transceiver that is connected to the port on the computing device. For example, auto-negotiation and FEC are typically enabled at a computing device having a SFP28 transceiver for an SFP28 direct attach copper (DAC) cable, auto-negotiation is disabled and FEC is enabled for an SFP28 active optic cable (AOC) or an SFP28 short range (SR) cable, and both auto-negotiation and FEC are disabled for SFP28 long reach (LR) cables. These different capabilities and/or settings between computing devices (i.e., resulting in auto-negotiation mismatch and FEC mismatch) may diminish the functionality of the auto-negotiation capabilities and/or result in a failure to establish a link between the connected computing devices.

Furthermore, some networking devices may be configured as pass-through modules that are transparent to LAN topologies and that provide direct Ethernet connectivity from blade servers to Top of Rack (TOR) switches of LANs, which may be beneficial when integrating multiple vendor blade servers into existing LANs. For example, pass-through modules may help deliver dedicated and isolated bandwidth between each server blade and the LAN. These pass-through modules often include PHY-only (non-MAC) SFP solutions and are configured to support fixed speeds (e.g., 25 Gb or 10 Gb) based on a static presence detection of the SFP module or DAC type. Additionally, a pass-through module may only support one 802.3 standard at a time. These issues often require an administrator to manually determine the auto-negotiation and 802.3 standard of each computing device, determine where the mismatch exists, and manually change PHY settings in one or both of the computing devices to correct the mismatches.

Accordingly, it would be desirable to provide an improved physical layer transceiver ability configuration system.

SUMMARY

According to one embodiment, an information handling system (IHS) includes a first communication subsystem that includes: a first physical layer transceiver (PHY) device configured to operate in a plurality of modes; and a first port coupled to the first PHY device; a processing system coupled to the first communication subsystem; and a memory system that is coupled to the processing system and that includes instructions that, when executed by the processing system, cause the processing system provide a PHY ability configuration engine that is configured to: determine, in response to an Ethernet transceiver device coupling with the first port while the first PHY device is configured to operate in a first mode of the plurality of modes, that a link is not detected at the first port; change the first mode of the first PHY device to a second mode of the plurality of modes; detect the establishment of the link at the first port; and provide network communications over the link.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
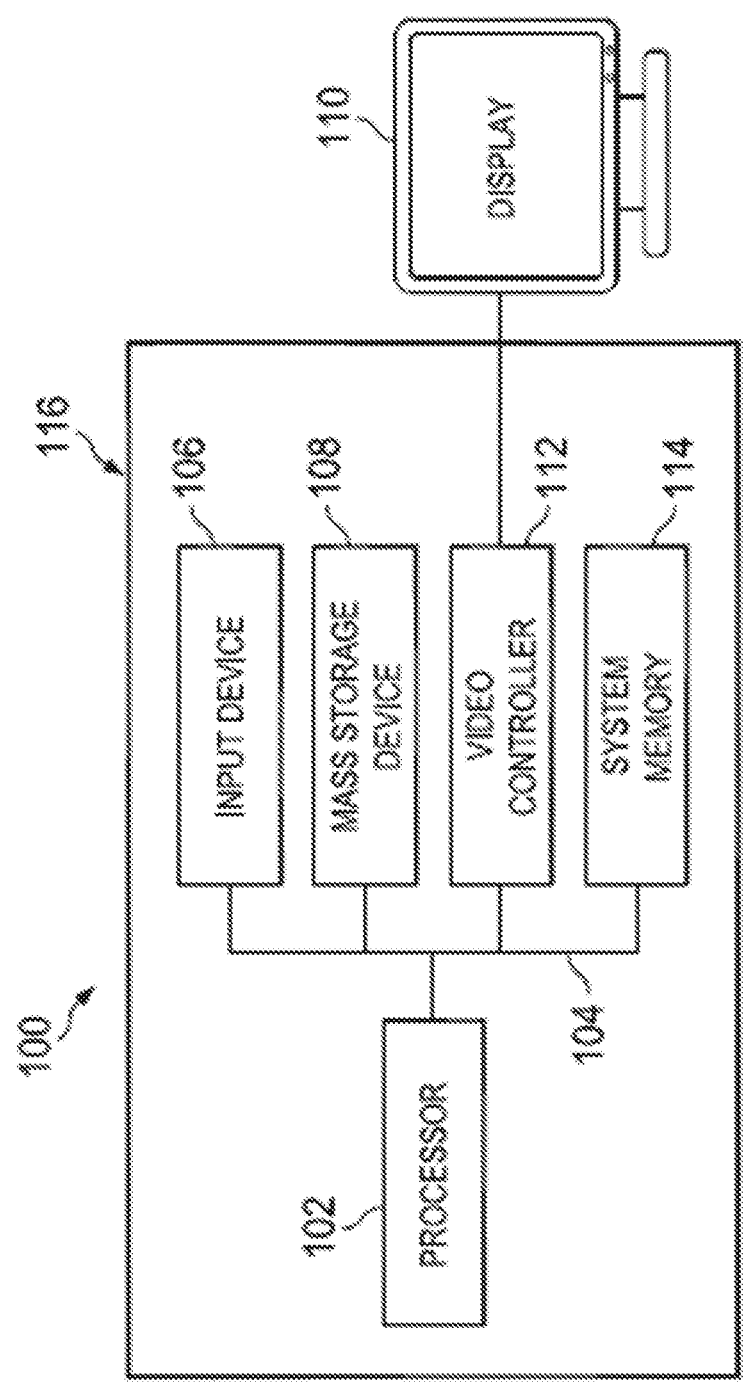
FIG. 1 is a schematic view illustrating an embodiment of an information handling system (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
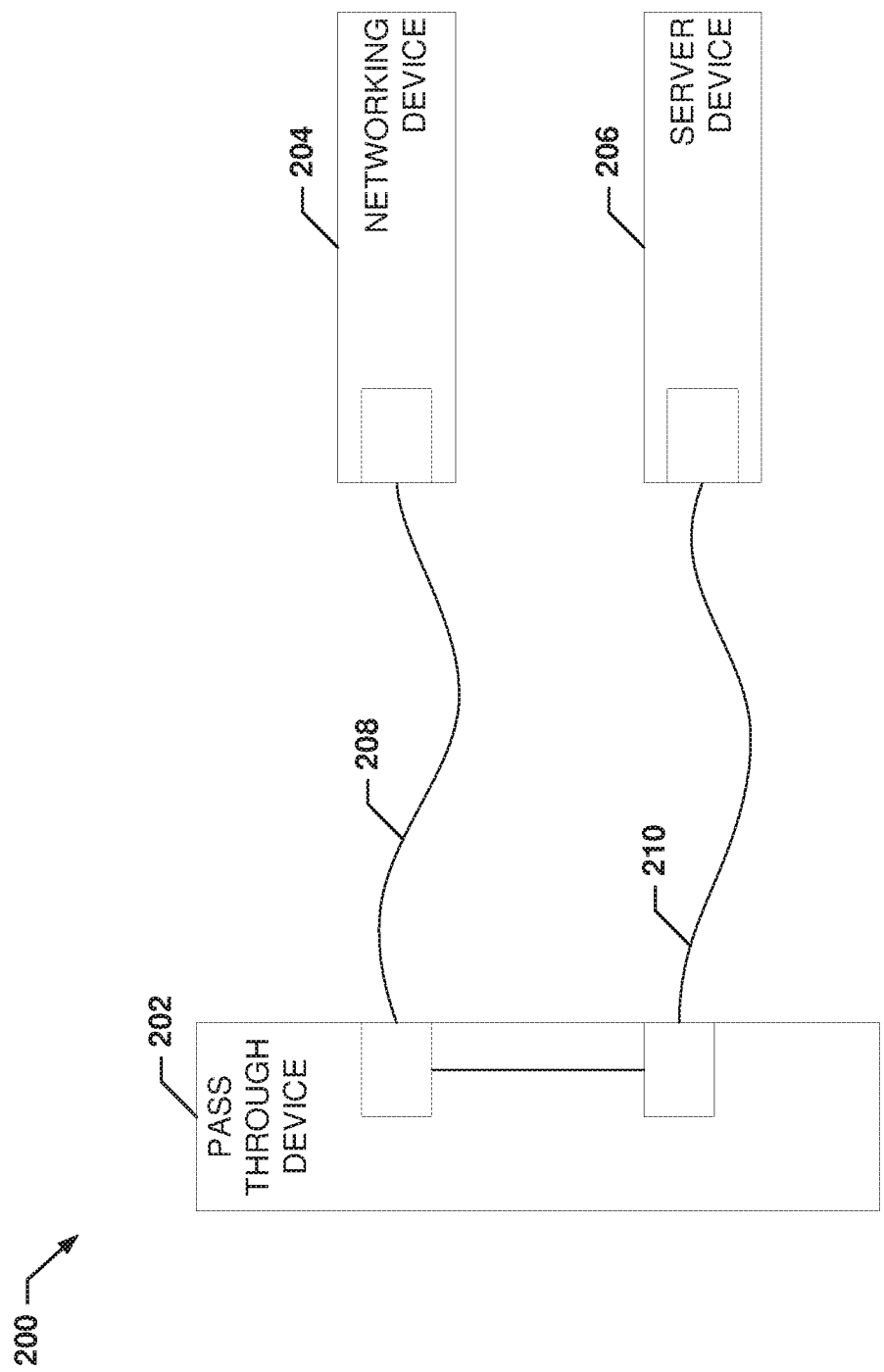
FIG. 2 is a schematic view illustrating an embodiment of a PHY ability configuration system.

Referring now to FIG. 2, an embodiment of a physical layer transceiver (PHY) ability configuration system 200 is illustrated. In the illustrated embodiment, the PHY ability configuration system 200 includes a pass-through networking device 202 which may be provided by the IHS 100 discussed above with reference to FIG. 1, and/or may include any or all of the components of the IHS 100. In a specific example, the pass-through networking device 202 may be provided by any of a variety of pass-through Input/Output (I/O) modules that provide for a non-switching connectivity of each Network Interface Card (NIC) port on a server device to a Top-Of-Rack (TOR) switch. However, one of skill in the art would recognize that other networking devices such as switch devices, router devices, and/or other networking devices that would be apparent to one of skill in the art in possession may be substituted for the pass-through networking device 202 while remaining within the scope of the present disclosure as well. While the illustrated embodiment includes only one pass-through networking device, one of skill in the art in possession of the present disclosure will also recognize that datacenter networks, enterprise networks, server provider networks, and/or other networks will often include many more pass-through networking devices, and those networks will fall within the scope of the present disclosure as well.

In the illustrated embodiment, the pass-through networking device 202 is coupled to a TOR switch device 204. The TOR switch device 204 may be provided by the IHS 100 discussed above with reference to FIG. 1, and/or may include any or all of the components of the IHS 100. In a specific example, the TOR switch device 204 may be provided by any of a variety of switch devices, router devices, and/or other networking devices that would be apparent to one of skill in the art in possession of the present disclosure. While the illustrated embodiment includes only one TOR switch device 204, one of skill in the art in possession of the present disclosure will recognize that datacenter networks, enterprise networks, server provider networks, and/or other networks will often include many more TOR switch devices, and those networks will fall within the scope of the present disclosure as well.

In the illustrated embodiment, the pass-through networking device is also coupled to a server device 206. The server device 206 may be provided by the IHS 100 discussed above with reference to FIG. 1, and/or may include any or all of the components of the IHS 100. In a specific example, the server device 206 may be provided by any of a variety of server devices that may be located in a server rack or chassis. While the illustrated embodiment includes only one server device, one of skill in the art in possession of the present disclosure will recognize that datacenter networks, enterprise networks, server provider networks, and/or other networks will often include many more server devices, and those networks will fall within the scope of the present disclosure as well.

The TOR switch device 204 may be coupled to the pass-through networking device 202 by a cable 208. Similarly, the server device 206 may be coupled to the pass-through networking device 202 by a cable 210. The cable 208 and/or the cable 210 may be any of a variety of electrical or optical cables such as, for example, direct attach copper (DAC) cables, active optic cables (AOC), short range (SR) optic cables, long reach (LR) optic cables, extended reach (ZR) optic cables, and/or any other cable that would be apparent to one of skill in the art in possession of the present disclosure. The cables 208 and/or 210 may include connectors at either end, which may be provided by one or more connectors that are configured to couple with Small Form-factor Pluggable (SFP) transceivers, enhanced Small Form-factor Pluggable (SFP+) transceivers, SPF28 transceivers, 10 Gigabit Small Form-factor Pluggable (XFP) transceivers, Quad(4-channel) Small Form-factor Pluggable (QSFP or QSFP+) transceivers, and/or a variety of other transceivers that would be apparent to one of skill in the art in possession of the present disclosure. The cables 208 and/or 210 may span lengths such as 1 m, 2 m, 3 m, 5 m, 7 m, 10 m, 15 m, 20 m, 100 m, 10 km, and/or any other length that would be apparent to one of skill in the art in possession of the present disclosure. While a specific PHY ability configuration system 200 has been illustrated and described, one of skill in the art in possession of the present disclosure will recognize that PHY ability configuration systems provided according to the teachings of the present disclosure may include different devices and/or device configurations while remaining within the scope of the present disclosure as well.

Figure 3:
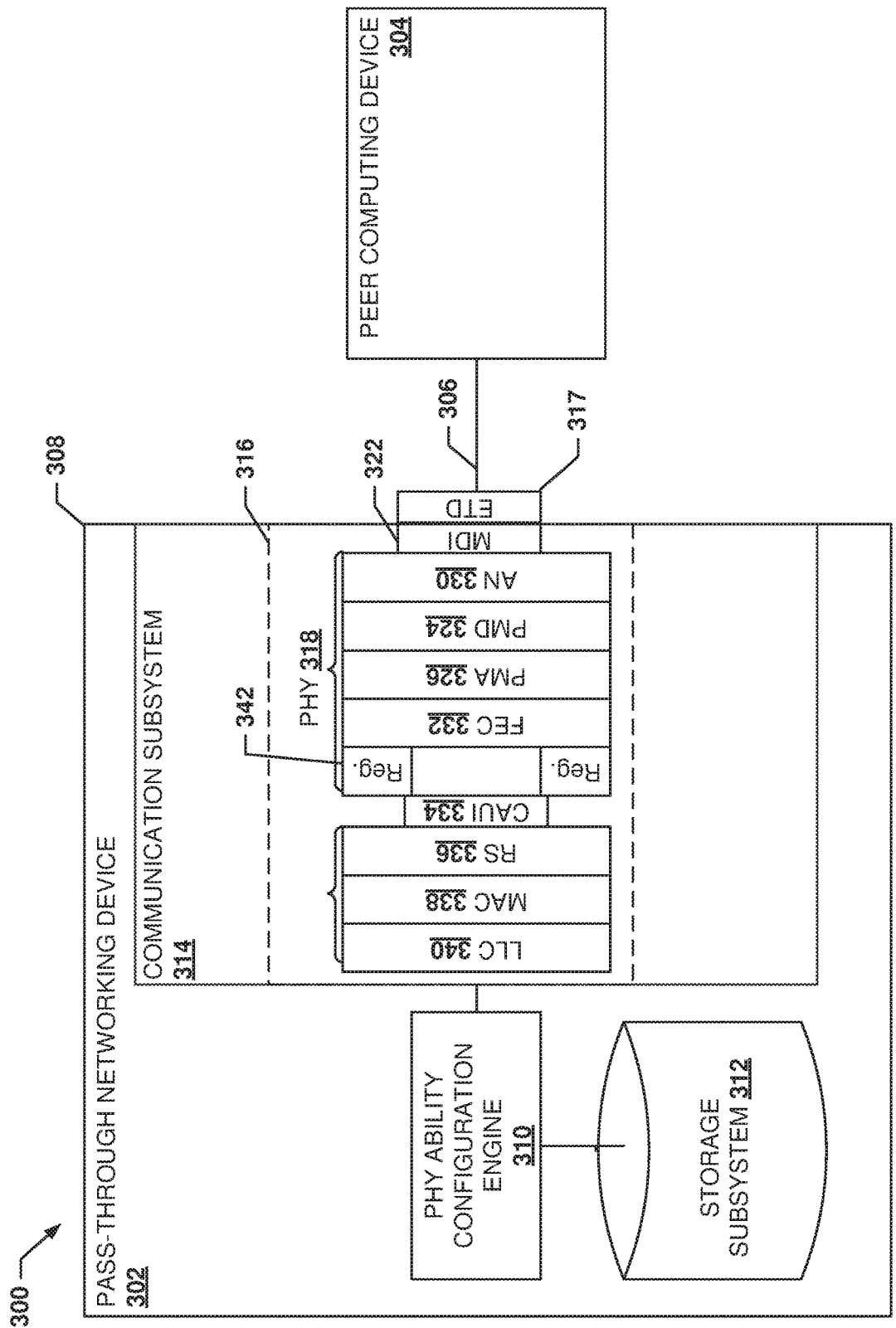
FIG. 3 is a schematic view illustrating an embodiment of the PHY ability configuration system of FIG. 2.

Referring now to FIG. 3, an embodiment of a PHY ability configuration system 300 is illustrated that may provide at least a portion of the PHY ability configuration system 200 of FIG. 2. In the illustrated embodiment, the PHY ability configuration system 300 includes a pass-through networking device 302 that may the pass-through networking device 202 of FIG. 2, and a peer computing device 304 that may be the TOR switch device 204 or the server device 206 of FIG. 2. As such, the pass-through networking device 302 and the peer computing device 304 may be coupled together by a cable 306 that may be one of the cables 208 and 210 of FIG. 2. In the illustrated embodiment, the pass-through networking device 302 includes a chassis 308 that houses the components of the pass-through networking device 302, only some of which are illustrated in FIG. 1. For example, the chassis 308 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide an PHY ability configuration engine 310 that is configured to perform the functions of the PHY ability configuration engines and the pass-through networking devices discussed below. In an embodiment of the present disclosure, the PHY ability configuration engine 310 may be provided on a microcontroller unit that may be configured to externally configure a PHY (e.g., the PHY device 318 discussed below) without the use of a Media Access Control (MAC). The PHY type used on the pass-through networking device 302 is of a "signal-repeater" type that does not terminate the link and establish effectively separate links on the system side and line side (e.g., the link on the cable 208 and the cable 206 is the same link rather than separate links). In this case the PHY device 318 of the pass-through networking device 302 at both the interface of the cable 208 and the cable 206 must be configured identically from a speed and FEC standpoint with the PHY device of the peer computing device 304. The lack of MAC accessibility requires a novel approach to this PHY configuration for a link to be achieved, given the settings agreement required as stated above.

The chassis 308 may also house a storage system (not illustrated, but which may include the storage device 108 discussed above with reference to FIG. 1) that is coupled to the PHY ability configuration engine 310 (e.g., via a coupling between the storage device and the processing system) and that includes a storage subsystem 312 that is configured to store the rules, settings, and/or other data utilized by the PHY ability configuration engine 310 in order to provide the functionality discussed below. The chassis 308 may also house a communication subsystem 314 that is coupled to the PHY ability configuration engine 310 (e.g., via a coupling between the communication subsystem 314 and the processing system), and that may include a network interface controller (NIC), a wireless communication subsystem, and/or other communication components known in the art.

In an embodiment, the communication subsystem 314 may include an Ethernet transceiver interface 316 that is configured according to the IEEE communications standards followed by the 25 Gigabit Ethernet Consortium and the IEEE 802.3 Task Force for single lane 25 Gigabyte Ethernet (GbE), discussed above. The Ethernet transceiver interface 316 may be configured to receive an Ethernet transceiver device (ETD) 317 (e.g., an SFP+transceiver device, an SFP28 transceiver device, etc.) that is coupled to the cable 306. As would be understood by one of skill in the art in possession of the present disclosure, the IEEE communications standards follow a reference model known as the Open System Interconnection (OSI) reference model, and the OSI reference model may include a physical layer that is provided by a physical layer transceiver (PHY) device 318. The OSI reference model breaks communications functionality further into a data link layer, a network layer, a transport layer, a session layer, a presentation layer, and application layer (not illustrated). Because the Ethernet transceiver interface 316 is provided in the pass-through networking device 302, a data link layer (e.g., non-Media Access Control (MAC) layer) may not be present. The IEEE 802.3 model facilitates the use of several mediums such as, for example, twisted pair technology, coaxial cable technology, copper technology, and fiber technology at speeds such as 10 Gbps, 25 Gbps, 40 Gbps, 50 Gbps, 100 Gbps, and higher. In addition, LAN's communicating information at legacy speeds such as 1 Megabit/sec, 10 Megabit/sec, 100 megabit/sec, and 1000 megabit/sec are considered by the IEEE 802.3, as well as other speeds that would be apparent to one of skill in the art in possession of the present disclosure.

The Ethernet transceiver interface 316 includes a media dependent interface (MDI) 322 which may include a port (e.g., an SFP/SFP+port, etc.) that is coupled to the PHY device 318. The PHY device 318 may include at least a physical medium dependent (PMD) layer 324, which interfaces to a physical medium attachment (PMA) layer 326. However, in the later versions of the IEEE 802.3 standard, additional features like an auto-negotiation module 330, a forward error correction (FEC) module 332, and other features such as link training were added, but those features are not required in every PHY device 318. The PHY device 318 then connects with an interface such as a 100 Gb Attachment Unit Interface (CAUI) interface 334). Finally, the CAUI 334 connects to a reconciliation layer 336 of the data link layer, which in turn interfaces with a media access control (MAC) 238, which in turn interfaces with the link layer control 340. In various embodiment, the PHY device 318 does not include a physical coding sublayer (PCS). This is important as having PCS layer would allow the system and line-side links (e.g., the link on the cable 208 to networking device 204 and the link on the cable 210 to the server device 206) to be effectively separate links from a configuration standpoint—where in the embodiments of the present disclosure the PHY settings must be identical for link to be achieved as the PHY device 318 is a pure "signal-repeater".

As discussed above, the auto-negotiation module 330 may not be included in the communication subsystem 314. However, in various examples in which the auto-negotiation module 330 is included in the communication subsystem 314, the auto-negotiation module 330 may include one or more auto-negotiation abilities such as, for example, a 100 GbE auto-negotiation ability, a 50 GbE auto-negotiation ability, a 25 GbE auto-negotiation ability, 10 GbE auto-negotiation ability, and/or any other auto-negotiation ability that would be apparent to one of skill in the art in possession of the present disclosure. Each auto-negotiation ability may be associated with corresponding auto-negotiation features that allow the pass-through networking device 302 and another computing device (e.g., the peer computing device 304) to negotiate appropriate transmission parameters and settle on the highest, mutually supported set of transmission parameters.

The PHY device 318 may also include a plurality of registers 342 that, in some embodiments, may be included in the PCS 328. The plurality of registers 342 may store variable transmission parameters that define the operation modes of the Ethernet transceiver interface 316, and may also allow for the PHY device 318 to turn on and off the PMA layer 326, as well as restart an auto-negotiation process. In various examples, the plurality of registers may include a control register, a status register, a PHY identifier register, an auto-negotiation advertisement register, an auto-negotiation link partner base page ability register, an auto-negotiation expansion register, an auto-negotiation next page transmit register, an auto-negotiation link partner received next page register, one or more reserved registers, one or more vendor registers, and/or conventional registers that would be apparent to one of skill in the art in possession of the present disclosure. In an embodiment of the present disclosure, the PHY device 318 may also include PHY ability register(s) that store the settings of the PHY device 318 that are discussed in more detail below.

While specific components of the pass-through networking device 302 have been illustrated and described, one of skill in the art in possession of the present disclosure will recognize that other components may be included in the chassis 308 and may be utilized to perform conventional computing device functionality, as well as the functionality described below, while remaining within the scope of the present disclosure. Furthermore, while a specific pass-through networking device 302 is illustrated and has been briefly described, one of skill in art in possession of the present disclosure will recognize that the peer computing device 304 may include some or all of the components of the pass-through networking device 302 described above. As such, in some examples the peer computing device 304 may include the same capabilities and/or default settings as the pass-through networking device 302, while in other examples the peer computing device 304 may include different capabilities and/or default settings than those of the pass-through networking device 302, as discussed in further detail below. In some examples, the peer computing device 304 may include different PHY device capabilities and/or default settings than the pass-through networking device 302.

Figure 4:
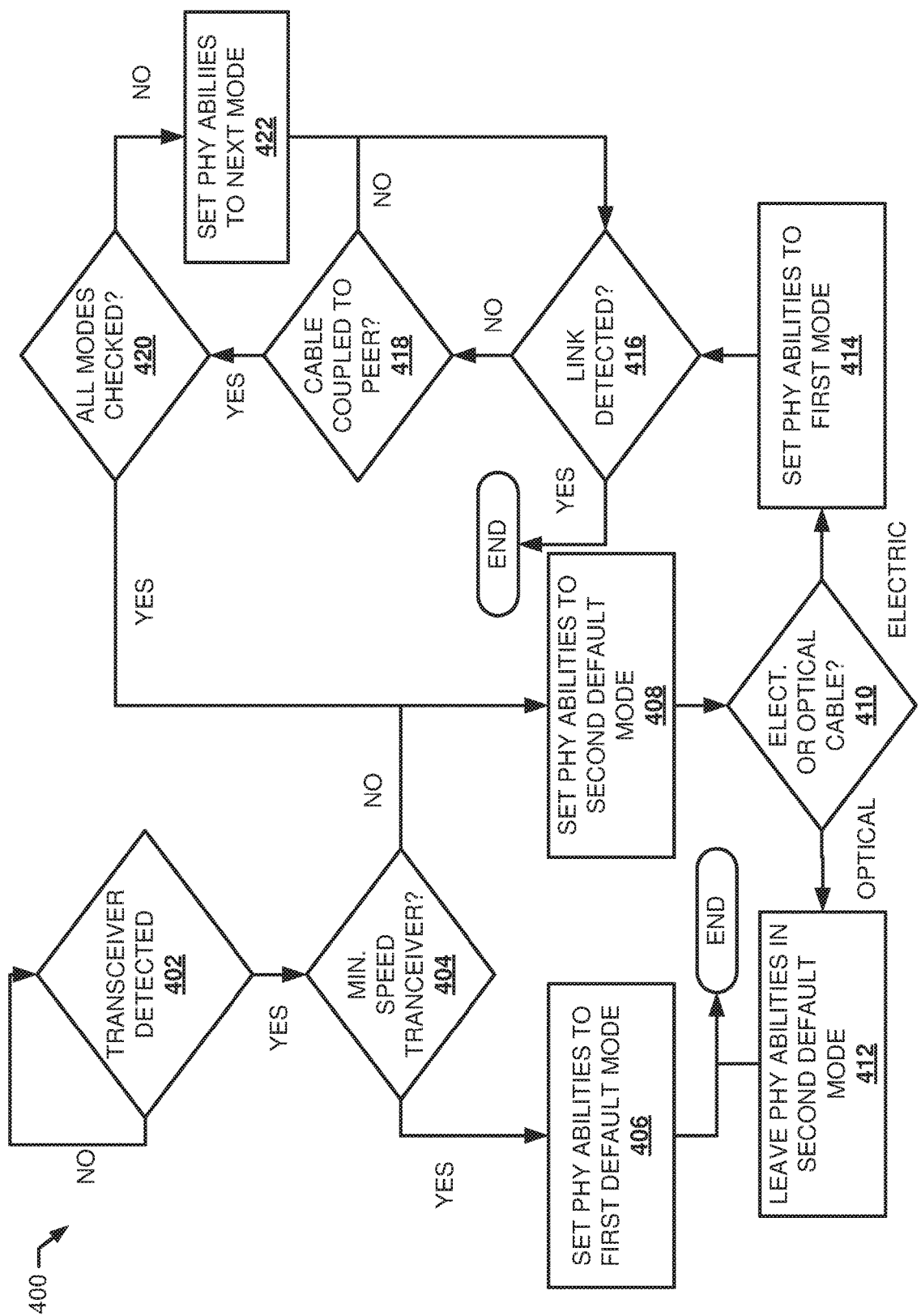
FIG. 4 is a flow chart illustrating an embodiment of a method for PHY ability configuration.

Referring now to FIG. 4, an embodiment of a method 400 for PHY ability configuration is illustrated. As discussed above, when establishing an Ethernet link between a pass-through networking device and a peer computing device, an auto-negotiation processes may occur at a PHY to automatically bring up the link between the two computing devices. Conventionally, the auto-negotiation process occurs such that each computing device may learn possible operation modes based on link abilities provided by variable transmission parameters that the other computing device is configured to implement to transmit data. However, the creation of new 802.3 standards defining PHY abilities, the presence of an auto-negotiation ability, the presence of FEC, and/or other physical layer level abilities has resulted in the possibility that each computing device may have slightly different PHY capabilities and/or default settings. For example, some computing devices may have some PHY abilities disabled, and/or may not have a particular PHY ability that exists and is enabled on its connected computing device. As discussed above, these mismatches in PHY abilities and/or default settings may prevent the link between the pass-through networking device and the peer computing device from being established, and requires a user of the pass-through networking device to manually locate and change the PHY settings to correct the mismatch so that the link between the pass-through networking device and the peer computing device may be established, which is inefficient and time consuming especially for pass-through networking devices that are designed to be plug-and-play type devices that require no configuration. In embodiments of the present disclosure, a pass-through networking device may reconfigure its PHY with various PHY abilities until a link is established between the pass-through device and the peer device.

The method 400 begins at decision block 402 where a pass-through networking device monitors for a connection of an Ethernet transceiver device to the communication system of the pass-through networking device. In an embodiment of decision block 402, the pass-through networking device 302 monitors the Ethernet transceiver interface 316 in the communication subsystem 314 in order to detect the connection of the Ethernet transceiver device 317 that may be coupled to the cable 306. For example, the PHY ability configuration engine 310 may monitor a module absent (e.g., MOD_ABS) pin provided in the Ethernet transceiver interface 316 that indicates whether the Ethernet transceiver device 317 is present in the Ethernet transceiver interface 316 (e.g., logical "0" may indicate that the Ethernet transceiver device 317 is present at Ethernet transceiver interface 316 while a logical "1" may indicate that the Ethernet transceiver device 317 is not present at Ethernet transceiver interface 316).

If the Ethernet transceiver device 317 is present, then the method 400 may proceed to decision block 404 where it is determined whether the maximum transmission speed of the Ethernet transceiver device 317 is the minimum supported transmission speed of the communication system in the pass-through networking device. In an embodiment of decision block 404, the PHY ability configuration engine 310 may determine whether the maximum transmission speed of the Ethernet transceiver device 317 is the minimum supported transmission speed of the communication subsystem 314. For example, the PHY ability configuration engine 310 may first determine the supported speed of the Ethernet transceiver device 317. In an embodiment, the PHY ability configuration engine 310 may read the Ethernet transceiver device 317 to determine the maximum supported transmission speed of the Ethernet transceiver device 317. For example, an SFP28 transceiver device may have a 25 Gbps maximum transmission speed, while an SFP+transceiver device may have a 10 Gbps maximum transmission speed. The PHY ability configuration engine 310 may read the cable capabilities through the cable's 120 EEPROM as defined by the SFF-8472 Specification from SNIA.

If the maximum supported transmission speed of the Ethernet transceiver device 317 is the minimum supported transmission speed of the communication subsystem 314 of the pass-through networking device 302, the method 400 may proceed to block 406 where the pass-through networking device sets the PHY abilities to a first default mode. In an embodiment of block 406, the PHY ability configuration engine 310 may determine that the maximum supported transmission speed of the Ethernet transceiver device 317 is the minimum supported transmission speed of the communication subsystem 314 in the pass-through networking device 302. In response, the PHY ability configuration engine 310 may configure the PHY abilities in the plurality of registers 342 and/or in any of the layers 324-332 of the PHY device 318 to a first default mode. For example, the Ethernet transceiver interface 316 on the communication subsystem 314 may interface with an SFP+transceiver device or an SFP28 transceiver device. In a specific example, if an SFP+transceiver device that supports a maximum 10 Gbps transmission speed is connected to the Ethernet transceiver interface 316, and if the SFP+transceiver device provides the slowest transmission speed for the Ethernet transceiver interface 316, then the PHY ability configuration engine 310 may configure the PHY abilities of the PHY device 318 with a first default mode and the method 400 may end. For example, the first default mode may include 10 Gb PLL use fixed settings.

If the maximum supported transmission speed of the Ethernet transceiver device 317 is not the minimum supported transmission speed of the communication subsystem 314 in the pass-through networking device 302, the method 400 may proceed to block 408 where the pass-through networking device sets the PHY abilities to a second default mode. In an embodiment of block 408, the PHY ability configuration engine 310 may determine that the maximum supported transmission speed of the Ethernet transceiver device 317 is not the minimum supported transmission speed of the communication subsystem 314 of the pass-through networking device 302. In response, the PHY ability configuration engine 310 may configure the PHY abilities of the PHY device 318 to a second default mode that is associated with the maximum supported transmission speed. For example, an Ethernet transceiver interface 316 on the communication subsystem 314 may interface with an SFP+ transceiver device or an SFP28 transceiver device. In a specific example, if an SFP28 transceiver device that supports 25 Gbps transmission speed is connected to the Ethernet transceiver interface 316, and if the SFP28 transceiver device provides a transmission speed that is greater than the minimum supported transmission speed, then the PHY ability configuration engine 310 may configure the PHY abilities of the PHY device 318 with a second default mode. For example, the second default mode may include a 25 Gb PLL and forced settings.

The method 400 may then proceed to decision block 410 where it is determined whether the Ethernet transceiver device is configured for an optical cable or an electrical cable. In an embodiment of decision block 410, the PHY ability configuration engine 310 may determine the cable type supported by the Ethernet transceiver device 317. For example, the Ethernet transceiver device 317 may be configured for an SFP28 direct attach copper (DAC) cable or an SFP28 active optic cable (AOC). The PHY ability configuration engine 310 may determine the cable type supported by the Ethernet transceiver device 317 by reading from the cable 120 interface as defined by the SFF-8472 specification. Copper is defined as a "passive" type cable while optical is defined as "active" type cable. If the Ethernet transceiver device 317 is configured for an optical cable, the method may proceed to block 412 where the PHY abilities of the PHY device 318 remain in the second default mode and the method 400 may end. For example, in response to the PHY ability configuration engine 310 determining that the Ethernet transceiver device 317 is coupled to an optical cable, the PHY ability configuration engine 310 may maintain the second default mode (e.g., the 25 Gb forced settings).

However, if the Ethernet transceiver device 317 is configured for an electrical cable, the method 400 may proceed to block 414 where the PHY abilities are set to a first mode. In an embodiment of block 414, in response to the PHY ability configuration engine 310 determining that the Ethernet transceiver device 317 is coupled to an electrical cable (e.g., a DAC coupled to the Ethernet transceiver device 317 via an RJ45 port), then PHY ability configuration engine 310 may set the PHY abilities of the PHY device 318 to a first mode. In an embodiment, the first mode may be a mode that includes as many PHY abilities as possible that are supported by the communication subsystem 314 of the pass-through networking device 302. For example, the PHY device 318 may support auto-negotiation and may support both the 25 Gigabit Ethernet Consortium standard and the IEEE 802.3by (25 Gigabit Ethernet) standard. Therefore, the first mode may enable PHY abilities of auto-negotiation and both the 802.3by PHY abilities and the Consortium PHY abilities.

The method 400 may then proceed to decision block 416 where it is determined whether a link is established. In an embodiment of decision block 416, the PHY ability configuration engine 310 may determine whether a link is established at the Ethernet transceiver interface. After setting the PHY abilities to the first mode, the PHY ability configuration engine 310 may wait a predetermined time before checking whether a link has been achieved at the Ethernet transceiver interface 316. For example, the predetermined time may allow enough time for a link to establish. The PHY ability configuration engine 310 may detect a link by continuously polling the clock and data recovery (CDR) lock status from the PHY PMD device. If CDR lock is established reliably, the PHY ability configuration engine 310 considers that as the link having been achieved. If a link is detected by the PHY ability configuration engine 310, one of skill in the art in possession will recognize that the PHY abilities of the first mode match the PHY abilities of the peer computing device 304 that is coupled to the pass-through computing device, which allows a link to be established. The method 400 may then end.

However, if a link is not detected at decision block 416, the method 400 may proceed to decision block 418 where it is determined whether there is a connection between the pass-through networking device and the peer computing device. In an embodiment of decision block 418, the PHY ability configuration engine 310 may determine whether there is a connection between the peer computing device 304 and the pass-through networking device 302. For example, the PHY ability configuration engine 310 may determine that the cable 306 is not connected to both the peer computing device 304 and the pass-through networking device 302. In a specific example, the PHY ability configuration engine 310 may check a receiver loss of signal indication (e.g., RXLOS) pin on the Ethernet transceiver interface 316 to determine whether the receiver loss of signal indication indicates that a connection exists between the peer computing device 304 and the pass-through networking device 302 (e.g., if the RXLOS provides a logical "1" there is a signal loss and no connection, while a logic "0" indicates normal operation and a connection). If there is no physical connection between the peer computing device 304 and the pass-through networking device 302, then the PHY ability configuration engine 310 may wait the predetermined time (or a wait a second predetermined time that is different than the predetermined time) before returning to decision block 416.

If a link is not detected at decision block 416, and a physical connection between the pass-through networking device and the peer computing device is detected at decision block 418, the method 400 may proceed to decision block 420 where it is determined whether all possible modes of the PHY have been checked. In an embodiment of decision block 420, if the PHY ability configuration engine 310 determines that a link is not detected while a physical connection is detected between the pass-through networking device 302 and the peer computing device 304, then such a determination may indicate there is a mismatch of the PHY abilities according to the first mode with the PHY abilities of the peer computing device 304, which may prevent the link between the pass-through networking device 302 and the peer computing device 304 from being established. As such, the PHY ability configuration engine 310 may determine whether any other modes with different PHY abilities have been tried. For example, another mode may be the second default mode that includes 25 Gb forced settings with no auto-negotiation. In another example, because a SFP28 transceiver device may support 10 Gbps speeds as well as 25 Gbps speeds, another mode may include configuring the PHY abilities of the PHY device 318 with 10 Gb PLL and forced settings, and/or the first default mode. In another example, the peer computing device 304 may only support 10 Gb speeds, and setting the PHY abilities to such speeds may result in a link establishing. While specific examples of modes have been described, one of skill in the art in possession of the present disclosure would recognize that a mode may include disabling/enabling other PHY abilities that may prevent a link from being established (due to a mismatch with the PHY abilities at the pass-through networking device 302 and at the peer computing device 304). If all modes have been checked at decision block 420, then the method 400 may return to block 408 as the configuration settings at either the networking device 204 or the server device 206 can be changed on-the-fly resulting in a link being achievable on subsequent retries of the same PHY configuration settings that failed to link previously.

If, at decision block 420, not all PHY ability configurations according to the various modes have been tried when establishing a link, then the method 400 may proceed to block 422 where the PHY abilities are configured according to a remaining mode. In an embodiment of block 422, the PHY ability configuration engine 310 may configure the PHY abilities of the PHY device 318 according to a second mode. For example, the second mode may be a 25 Gb forced setting such as that used in the second default mode. In some embodiments, the peer computing device 304 may not support auto-negotiation, and therefore may have caused a mismatch with the first mode which would result in a link not being established. The PHY ability configuration engine 310 may wait a predetermined time before checking a link status at decision block 416, and the method 400 may loop through blocks 416-422 until a link is established or until all of the modes have been tried at block 422. For example, the PHY ability configuration engine 310 may configure the PHY device 318 with PHY abilities according to a third mode. In a specific example, the third mode may be a 10 Gb forced setting mode. In some embodiments, the peer computing device 304 may not support 25 Gb transmission speeds, which may cause a mismatch with the first mode and the second mode that results in a link not establishing between the peer computing device 304 and the pass-through networking device 302. In one example of block 422, the remaining mode may be selected based on a hierarchy of modes where the higher performance modes are tried before the lower performance modes. For example, modes with auto-negotiation may be tried before modes without auto-negotiation, modes with faster speeds may be tried before modes with slower speeds, etc. However, in various embodiments the modes may be tried in any order that would be apparent to one of skill in the art in possession of the present disclosure.

Thus, systems and methods have been described that provide for the configuration of the ability of a PHY on a pass-through networking device without using a MAC to configure the PHY. A PHY ability configuration engine on a microcontroller external to the PHY may configure the PHY with PHY abilities according to various modes, and the PHY ability configuration engine may cycle through the modes until a link is established between the pass-through networking device and a computing device to which it is connected via the PHY. Such functionality automatically removes mismatches between PHY abilities of the pass-through networking device and its peer computing device. Therefore, if there is a mismatch in the respective PHY abilities, one or more of the computing devices may correct the mismatch automatically in order to allow the link to be established using a common auto-negotiation operation, or using a forced speed mode. Thus, the PHY ability configuration systems and methods of the present disclosure reduce the time needed to correct PHY ability mismatch related issues when establishing a link between the pass-through networking device and its peer computing device that may have been manufactured or otherwise configured according to different standards and abilities.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A physical layer transceiver (PHY) ability configuration system, comprising:
   a first computing device having a first communication subsystem that includes:
      a first PHY device and that is configured to operate in at least one mode; and
      a first port that is coupled to the first PHY device; and
   a second computing device having a second communication subsystem that includes:
      a second PHY device and that is configured to operate in a plurality of modes; and
      a second port that is coupled to the second PHY device, wherein the first port and the second port are coupled together via a cable, and wherein the second computing device is configured to:
         determine a cable speed from an Ethernet transceiver device connected to the cable and coupled with the second port;
         configure the second PHY device with a first default mode of the plurality of modes when the cable speed provides a first speed that is a minimum supported speed of the second PHY device, wherein the first default mode includes a first default set of PHY abilities;
         configure the second PHY device with a second default mode of the plurality of modes when the cable speed provides a second speed, wherein the second default mode includes a second default set of PHY abilities;
         determine that the cable is a second cable type and, in response, maintain the second default mode;
         determine, in response to the cable coupling the first port and the second port while the second PHY device is configured to operate in a first mode of the plurality of modes, that a link is not detected at the second port, wherein the first mode includes a first set of PHY abilities;
         change, in response to the determining that the link is not detected at the second port, the first mode of the second PHY device to a second mode of the plurality of modes, wherein the second mode includes a second set of PHY abilities;
         detect, subsequent to the change, establishment of the link between the second port and the first port; and
         provide network communications over the link.

2. The system of claim 1, wherein the second computing device is configured to:
   determine that the cable is a first cable type and, in response, configure the second PHY device with the first mode of the plurality of modes.

3. The system of claim 2, wherein the first cable type is a direct attached copper cable.

4. The system of claim 1, wherein the second computing device is configured to:
   detect that the cable is not coupled to the first port and, in response, wait a predetermined time; and
   check, subsequent to the predetermined time, a link status of the cable to determine whether the link is detected at the second port.

5. An information handling system (IHS), comprising:
   a first communication subsystem that includes:
      a first physical layer transceiver (PHY) device configured to operate in a plurality of modes; and
      a first port coupled to the first PHY device;
   a processing system coupled to the first communication subsystem; and
   a memory system that is coupled to the processing system and that includes instructions that, when executed by the processing system, cause the processing system provide a PHY ability configuration engine that is configured to:
      determine, in response to an Ethernet transceiver device coupling with the first port, a cable speed of an Ethernet transceiver device; and
      configure the first PHY device with a first default mode of the plurality of modes when the cable speed provides a first speed that is a minimum supported speed of the first PHY device, wherein the first default mode includes a first default set of PHY abilities;
      configure the first PHY device with a second default mode of the plurality of modes when the cable speed provides a second speed, wherein the second default mode includes a second default set of PHY abilities;
      determine that the Ethernet transceiver device supports a direct attached copper cable type and, in response, configure the first PHY device with a first mode of the plurality of modes;
      determine, in response to the Ethernet transceiver device coupling with the first port while the first PHY device is configured to operate in the first mode of the plurality of modes, that a link is not detected at the first port, wherein the first mode includes a first set of PHY abilities;
      change, in response to the determining that the link is not detected at the first port, the first mode of the first PHY device to a second mode of the plurality of modes, wherein the second mode includes a second set of PHY abilities;
      detect, subsequent to the change, establishment of the link at the first port; and
      provide network communications over the link.

6. The IHS of claim 5, wherein the PHY ability configuration engine is configured to:
   determine that the Ethernet transceiver device supports a second cable type and, in response, maintain the second default mode.

7. The IHS of claim 5, wherein the PHY ability configuration engine is configured to
   detect that a cable connected to the Ethernet transceiver device is not coupled to a second port on a peer computing device and, in response, wait a predetermined time; and
   check, subsequent to the predetermined time, a link status of the cable to determine whether the link is detected at the first port.

8. A method of physical layer transceiver (PHY) ability configuration, comprising:
   determining, by a pass-through networking device that includes a first PHY device that is coupled to a first port and that is configured to operate in a plurality of modes, a cable speed associated with an Ethernet transceiver device that is connected to a cable and inserted in the first port;
   configuring, by the pass-through networking device, the first PHY device to operate in a first default mode that is included in the plurality of modes when the cable speed provides a first speed that is a minimum supported speed of the first PHY device, wherein the first default mode includes a first default set of PHY abilities;

configuring, by the pass-through networking device, the first PHY device to operate in a second default mode that is included in the plurality of modes when the cable speed provides a second speed, wherein the second default mode includes a second default set of PHY abilities;

determining, by the pass-through networking device, that the cable is a second cable type and, in response, maintaining the second default mode;

determining, by the pass-through networking device, that a link is not detected at the first port when the Ethernet transceiver device is connected to the cable that is coupled to the first port while the first PHY device is operating in a first mode that is included in the plurality of modes, wherein the first mode includes a first set of PHY abilities;

causing, by the pass-through networking device and in response to the determining that the link is not detected at the first port, the first PHY device to switch from operating in the first mode to operating in a second mode that is included in the plurality of modes, wherein the second mode includes a second set of PHY abilities;

detecting, by the pass-through networking device and subsequent to the switch, an establishment of the link between the first port and a second port on a peer computing device; and providing, by the pass-through networking device, network communications over the link.

9. The method of claim 8, further comprising:

determining, by the pass-through networking device, that the cable is a first cable type and, in response, configuring the first PHY device to operate in the first mode that is included in the plurality of modes.

10. The method of claim 9, wherein the first cable type is a direct attached copper cable.

* * * * *